310-800 SR
5/13/86 XR 4,588,998

United States Patent [19]

Yamamuro et al.

[11] Patent Number: 4,588,998

[45] Date of Patent: May 13, 1986

[54] INK JET HEAD HAVING CURVED INK

[75] Inventors: Tetsu Yamamuro, Tokyo; Kyuhachiro Iwasaki, Fujisawa, both of Japan

[73] Assignee: Ricoh Company, Ltd., Tokyo, Japan

[21] Appl. No.: 634,543

[22] Filed: Jul. 26, 1984

[30] Foreign Application Priority Data

| | | | |
|---|---|---|---|
| Jul. 27, 1983 | [JP] | Japan | 58-137247 |
| Jul. 27, 1983 | [JP] | Japan | 58-137248 |
| Aug. 10, 1983 | [JP] | Japan | 58-146190 |
| Aug. 11, 1983 | [JP] | Japan | 58-146867 |

[51] Int. Cl.[4] G01D 15/16

[52] U.S. Cl. 346/140 R; 310/800

[58] Field of Search 346/140 R, 75; 310/800

[56] References Cited

U.S. PATENT DOCUMENTS

| | | | |
|---|---|---|---|
| 4,088,915 | 5/1978 | Kodama | 310/800 X |
| 4,296,417 | 10/1981 | Markham | 346/140 X |
| 4,379,246 | 4/1983 | Guntersdorfer | 346/140 X |
| 4,403,382 | 9/1983 | Facoetti | 310/800 X |

FOREIGN PATENT DOCUMENTS 2256667 11/1972 Fed. Rep. of Germany .

*Primary Examiner*—Joseph W. Hartary
*Attorney, Agent, or Firm*—Oblon, Fisher, Spivak, McClelland & Maier

[57] ABSTRACT

An ink jet head for compressing ink in an ink chamber to eject a drop of the ink from a nozzle. Ink compressing means for compressing the ink in the ink chamber by expanding and contracting in response to a voltage applied thereto is made of a piezoelectric high molecular substance. The ink compressing means comprises a single thin film of polyvinylidene fluoride (PVDF) or two PVDF films bonded together in a bimorph structure. Multiple nozzles are arranged in a predetermined direction. The PVDF film expands and contracts in a direction parallel to the direction of arrangement of the multiple nozzles.

11 Claims, 36 Drawing Figures

INK JET HEAD HAVING CURVED INK

BACKGROUND OF THE INVENTION

The present invention relates to an ink jet head mounted in an ink jet recording apparatus for ejecting ink drops and, more particularly, to an ink jet head of the type which uses a piezoelectric high molecular substance to form an element for compressing ink in an ink chamber.

Various types of ink jet heads have been proposed for use with an ink jet recording apparatus. Typical of such ink jet heads is one which utilizes a ceramic piezoelectric element as the element for compressing ink in an ink chamber. The problem with this type of ink jet head is that the piezoelectric element and, therefore, an ink compressing section where the piezoelectric element is positioned occupies a substantial area to obstruct a multi-head, or multi-nozzle, construction. The other ink jet heads heretofore proposed include one which relies on the effect of an electric field or that of a magnetic field, and one which utilizes bubbles. The electric or magnetic field type ink jet head, however, requires relatively high drive voltage for operation and, therefore, its associated drive circuit cannot be reduced in size beyond a certain limit. The bubble type ink jet head, on the other hand, is poor in durability because it has to repeatedly produce bubbles by thermal pulses.

Generally, an ink jet head is constructed to eject ink drops by reducing the volume of an ink chamber in response to print signals, i.e., by compressing ink in the ink chamber. An attempt has recently been made to use a piezoelectric high molecular substance to form ink compressing means of the ink jet head. The piezoelectric high molecular substance is often selected from copolymers including polyvinylidene fluoride, polyvinyl fluoride, polyvinyl chloride, vinylidene fluoride and ethylene trifluoride (Poly—VDF·TrFE), high molecular compound piezoelectric substances such as PVDF/PZT, rubber/PZT, polyacetal/rubber/PZT and epoxy/PZT, etc. These piezoelectric high molecular substances are effectively usable as a material of an ink compressing element of an ink jet head due to their advantageous physical properties such as flexibility, desirable adaptation to a curved configuration, ease of shaping in a thin film and increasing in size, and light weight. In contrast, inorganic piezoelectric elements are hard and quite susceptible to dynamic changes.

OBJECTS OF THE INVENTION

It is therefore an object of the present invention to provide a small size, multi-head construction of an ink jet head by use of a piezoelectric high molecular substance to form a member adapted to constitute ink compressing means.

It is another object of the present invention to provide an ink jet head which is feasible for quantity production and large-scale integration.

It is another object of the present invention to provide an ink jet head which is operable on relatively low voltages and which has little susceptibility to dielectric breakdown.

It is another object of the present invention to provide an ink jet head which allows a minimum of load to act on a substrate adapted to support ink compressing means made of a piezoelectric high molecular substance, when the ink compressing means is displaced for ink ejection.

It is another object of the present invention to provide a generally improved ink jet head.

SUMMARY OF THE INVENTION

An ink jet head for compressing ink to eject a drop of the ink of the present invention comprises a housing, an ink chamber defined in the housing, a nozzle defined in the housing and communicating to the ink chamber, and an ink compressing element for compressing ink communicated to the ink chamber. The ink compressing element is made of a piezoelectric high molecular substance which is curved inwardly in its rest condition and which flexes still further into the ink chamber upon actuation.

A multi-nozzle ink jet head for compressing ink to eject a drop of the ink of the present invention comprises a housing, a plurality of ink chambers defined in the housing, a plurality of nozzles defined and arranged in the housing in a predetermined direction and communicating to the ink chambers associated therewith in one-to-one correspondence, and ink compressing elements associated respectively with the ink chambers for compressing ink in the ink chambers by expanding and contracting in response to a voltage applied thereto. The ink compressing elements are made of a piezoelectric high molecular substance.

In accordance with the present invention, an ink jet head for compressing ink in an ink chamber to eject a drop of the ink from a nozzle is provided. Ink compressing means for compressing the ink in the ink chamber by expanding and contracting in response to a voltage applied thereto is made of a piezoelectric high molecular substance. The ink compressing means comprises a single thin film of polyvinylidene fluoride (PVDF) or two PVDF films bonded together in a bimorph structure. Multiple nozzles are arranged in a predetermined direction. The PVDF film expands and contracts in a direction parallel to the direction of arrangement of the multiple nozzles.

The above and other objects, features and advantages of the present invention will become apparent from the following detailed description taken with the accompanying drawings.

DESCRIPTION OF THE PREFERRED EMBODIMENTS

Figure 1:
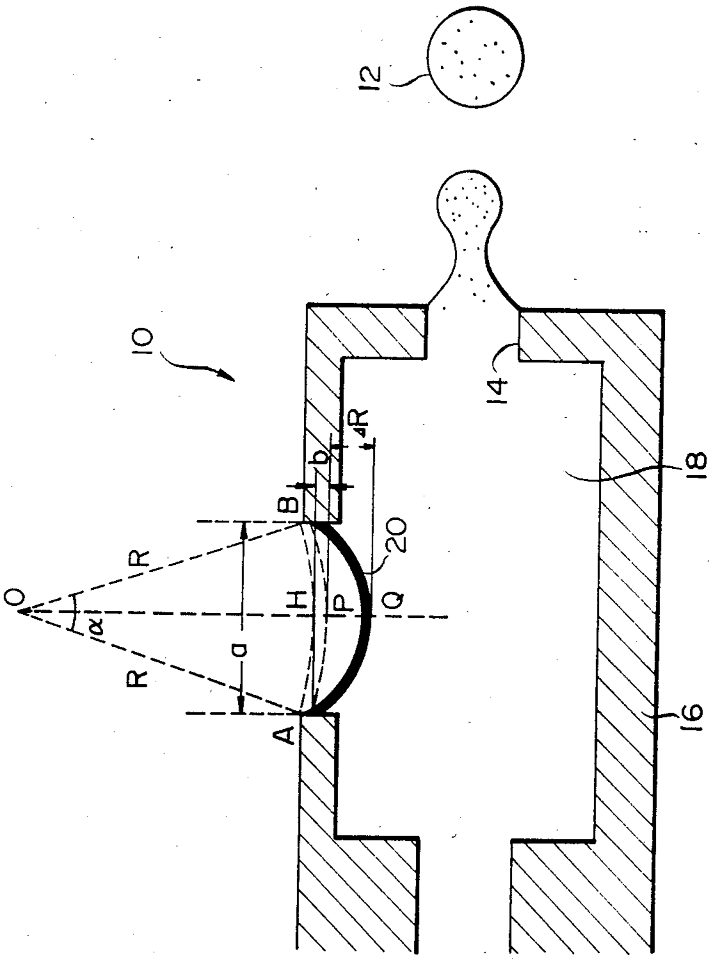
FIG. 1 is a fragmentary section of an ink jet head embodying the present invention which uses a film of piezoelectric high molecular substance as an ink compressing element.

Reference will be made first to FIG. 1 for describing the principle of operation of an ink jet head of the type which uses a piezoelectric high molecular substance for constructing ink compressing means.

As shown in FIG. 1, an ink jet head 10 comprises a housing 16 having a nozzle 14 for the ejection of an ink drop 12. The housing 16 has an ink chamber 18 thereinside. An ink compressing element 20 forms a part of the wall of the housing 16 and comprises a film of piezoelectric high molecular substance, e.g. polyvinylidene fluoride (PVDF). In order that ink in the ink chamber 18 may be compressed to eject the drop 12, it is necessary that the effective displacement be substantially equal to the volume of the drop 12. For example, assuming that the ink drop 12 is ejected from a nozzle which is dimensioned about 50 μm×50 μm, an effective displacement equal to $$Vo=4/3\times\pi(70/2)^3(\mu m^3),$$

where Vo is the volume of the drop 12, is required (as will be described in detail hereinafter). Thus, in the ink jet head 10, the key to effective ink ejection is attaining such an amount of effective displacement. Description will be made on this specific displacement.

Figure 2:
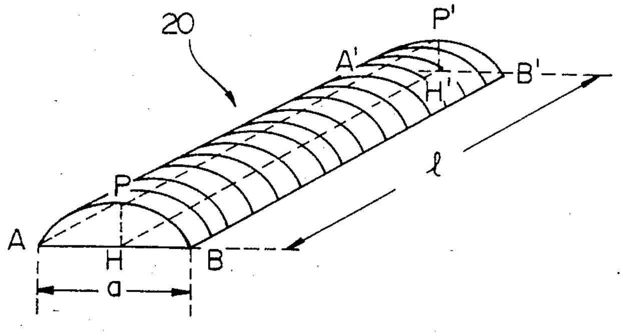
FIGS. 2 and 3 are diagrams representative of the principle of operation of the embodiment shown in FIG. 1.
Figure 3:
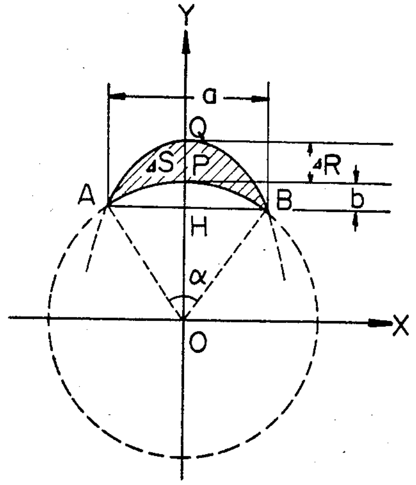
Figure 4:
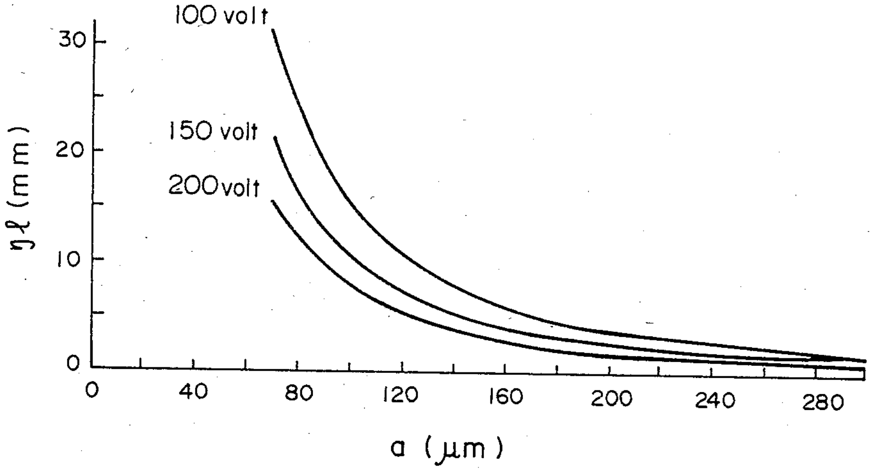
FIGS. 4–8 are plots showing a relationship between a length of the piezoelectric high molecular film shown in FIGS. 1–3 and a product of an effective efficiency and a length of a high molecular film with respect to various voltages applied to the ink compressing element.
Figure 5:
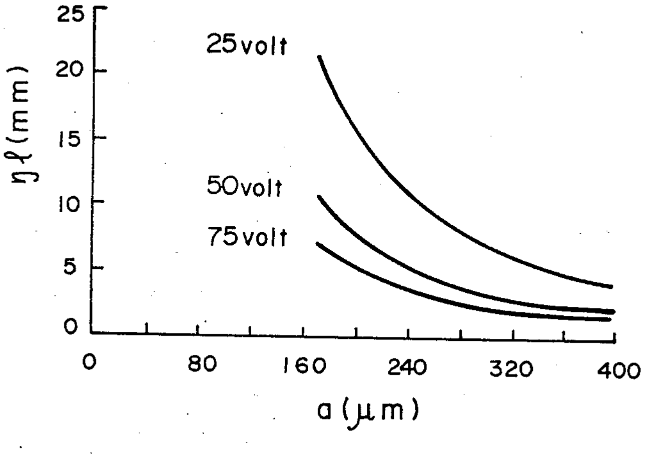
Figure 6:
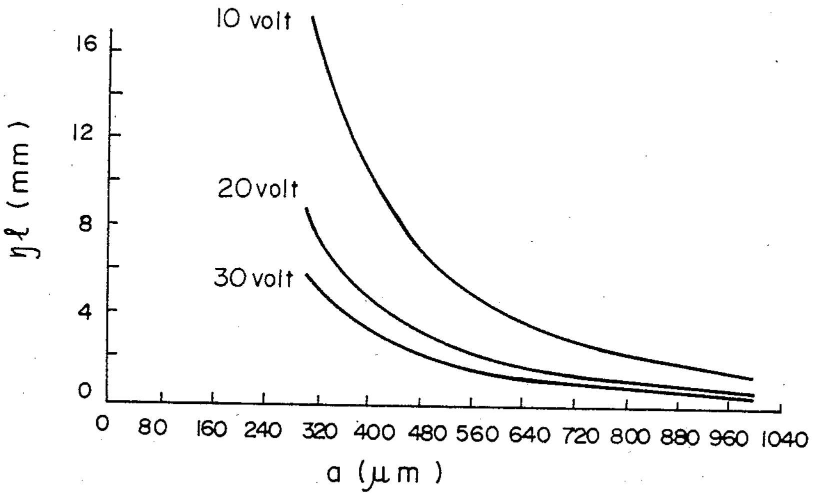
Figure 7:
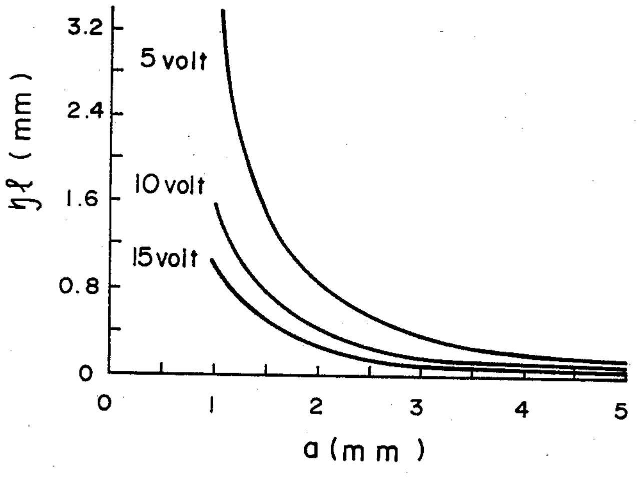
Figure 8:
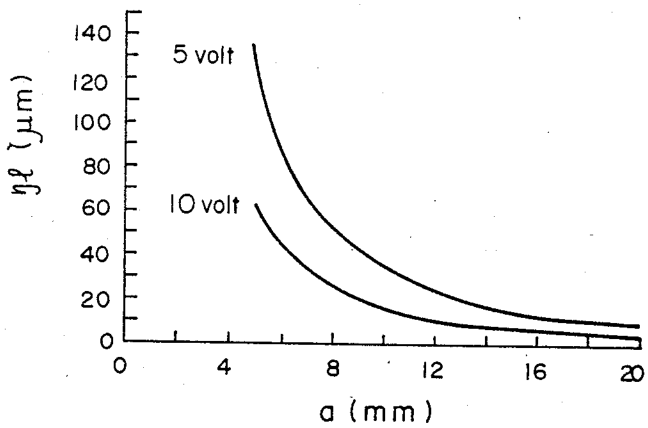

In FIGS. 1–3, the center of curvature defined when the PVDF film 20 is bent is denoted by O, the radius of curvature by OA=OB (=R), and the chord by AB (=a). Also, imagining a vertical line extending from the center O to the chord AB, its bottom is assumed to be H and the junction of the extension of the line OH with the chord AB, P. Let t denote the thickness of the curved PVDF film 20. When a voltage V is applied to the PVDF film 20, the transverse effect, i.e., the effect of the piezoelectric constant $d_{31}$ can be converted to a vertical or thicknesswise displacement. That is, the point P at the center portion of the curvature of the film 20 is displaced to a point Q. Assume that the displacement PQ of center portion of the curvature is ΔR, and that the shape before the displacement is an arc having a radius R and turns into a curve of secondary degree after the displacement. Then, the displacement ΔR is produced by $$\Delta R=3/2Rd_{31}\cdot V/t \qquad \text{Eq. (1)}$$

Utilizing the displacement ΔR caused by the application of a voltage, the present invention compresses ink in the chamber 18 to eject the ink drop 12.

The Eq. (1) holds when $9.75°\leqq a<90°$ where a is the angle which the arc APQ makes. Where $d_{31}=40$ PC/N, and use is made of a PVDF film which is t=20 μm thick, the following equation is obtained:

$$\Delta R\ (\mu m)=3\times10^{-6}R\ (\mu m)\cdot V\ (\text{Volt}) \qquad \text{Eq. (2)}$$

The Eq. (2) teaches that for a larger displacement ΔR a curvature having a larger radius of curvature is desirable. Since the radius of curvature R is R=(a/2)/sin (d/2), the maximum value of R when a=9.75° is $$R=(a/2)/\sin 4.875° \qquad \text{Eq. (3)}$$

Assuming that the effective displacement is ΔVeff, it may be expressed as a product of a displacement area ΔS defined by AQBPA in FIG. 1, the length l of the PVDF film 20, which is bent as shown in FIG. 2, in a direction perpendicular to the chord AP, i.e. ΔVeff =η·ΔS·l. It follows that ink is ejected when the previously stated relation is realized, that is:

$$\Delta Veff=\eta\cdot\Delta S\cdot l=4/3\pi\times(70/2)^3\ (\mu m^3) \qquad \text{Eq. (4)}$$

To calculate the effective displacement Veff, it is firstly required to calculate the displacement area ΔS. For the ease of understanding of this calculation, assume coordinates (X, Y) whose origin is defined by the center of curvature O, as shown in FIG. 3. The curve of secondary degree AQB and the arc APB are obtained from the coordinates and, from AQB and APB, the displacement area ΔS is obtained. Assuming that the distance between the center of the chord AB and that of the arc APQ is b, the displacement area ΔS is produced by $$\Delta S=\frac{a}{3}(3R+2\Delta R-b)-R^2\left\{\frac{\pi}{2}+\frac{a}{2R}\sqrt{1-\left(\frac{a}{2R}\right)^2}-\cos^{-1}\left(\frac{a}{2R}\right)\right\} \qquad \text{Eq.(5)}$$

In FIG. 1, concerning a, b and R, there holds a relation $b\ (2R-b)=(a/2)^2$, i.e., $b=R\ \{1-\sqrt{1-(a/2R)^2}\}$ $(0<b<R)$. Substituting this relation for b in the Eq. (5), $$\Delta S = \frac{a}{6}\left\{ 4(R + \Delta R) - R\sqrt{1 - \left(\frac{a}{2R}\right)^2} \right\} - R^2\left\{ \frac{\pi}{2} - \cos^{-1}\left(\frac{a}{2R}\right)\right\} \quad \text{Eq.(6)}$$

Values a, R and ΔR are necessary for obtaining ΔS. If the length a of the chord is known, the Eq. (2) provides R so that the Eq. (2) provides ΔR as a function of the voltage. In this manner, by substituting given a, R and ΔR for those in the Eq. (6) to obtain ΔS and, then, substituting it for that in the Eq. (4), the condition for ink to be ejected upon compression over the specific length a of chord can be determined in terms of a relationship betweeen V, η and l.

EXAMPLE

Assuming that the length a of the chord AB is 170 μm, there is obtained from the Eq. (3)

$$R=(170/2)/\sin 4.875° = 1000{\cdot}210\ \mu m$$

and, from the Eq. (2), $$\Delta R\ (\mu m) = 3.00063\times 10^{-3}\ V\,(volt)$$

Substituting it for one in the Eq. (6) produces $$\Delta S = (3.401\times 10^{-1}\ V - 0.198)\ \mu m^2$$

Substituting it for one in the Eq. (4) produces the ink ejection condition at the time of ink compression as $$\eta l\ (3.401\times 10^{-1}\ V - 0.198) = 179{,}600\ (\mu m^3)$$

Assuming that the applied voltage V is 50 volts, then ηl=10.69 mm. The relationship between the effective efficiency η and the length l is shown in Table 1. In Table 1, a is 170 μm, V is 50 volts, $d_{31}$ is 40 PC/N, and t is 10 μm. In this case, the initial radius of curvature is 1.00 mm; the displacement ΔR of the center portion is 0.150 μm when the applied voltage is 50 volts.

TABLE 1

| η (%) | l (mm) |
|---|---|
| 100 | 10.7 |
| 50 | 21.4 |
| 25 | 42.7 |

FIGS. 4–8 are plots showing a relationship between the product of effective efficiency η and length l and the length a of the chord AB with respect to various voltages. In all these plots, $d_{31}$ is 40 PC/N and t is 20 μm. Table 2 shows the displacement ΔR of the center portion and the product of effective efficiency η and the length l with respect to various values of length a of the chord AB, radius of curvature R, distance b between the center of the chord AB and that of the arc APQ, and applied voltage V. By so driving the bent PVDF film 20 by applying a voltage thereto, it is possible to compress ink to eject a drop thereby. It will be noted that reducing the thickness t of the film 20 allows the voltage V to be proportionally lowered.

TABLE 2

| a | R (mm) | b (μm) | V (Volt) | ΔR (μm) | ηl |
|---|---|---|---|---|---|
| 70 μm | 0.41 | 1.49 | 200 | 0.25 | 15.6 mm |
| | | | 100 | 0.12 | 31.3 mm |
| 170 μm | 1.00 | 3.62 | 100 | 0.30 | 5.3 mm |
| | | | 50 | 0.15 | 10.7 mm |
| 230 μm | 1.35 | 4.90 | 75 | 0.30 | 3.9 mm |
| | | | 50 | 0.20 | 5.8 mm |
| 340 μm | 2.00 | 7.24 | 30 | 0.18 | 4.5 mm |
| | | | 20 | 0.12 | 6.7 mm |
| | | | 10 | 0.06 | 13.9 mm |
| 400 μm | 2.35 | 8.51 | 30 | 0.21 | 3.2 mm |
| | | | 20 | 0.14 | 4.9 mm |
| | | | 10 | 0.07 | 10.0 mm |
| 500 μm | 2.94 | 10.6 | 30 | 0.26 | 2.1 mm |
| | | | 20 | 0.18 | 3.1 mm |
| | | | 10 | 0.09 | 6.4 mm |
| 1.0 mm | 5.88 | 21.3 | 20 | 0.35 | 0.78 mm |
| | | | 10 | 0.18 | 1.6 mm |
| | | | 5 | 0.09 | 3.3 mm |
| 5.0 mm | 29.4 | 106 | 20 | 1.77 | 31 μm |
| | | | 10 | 0.88 | 64 μm |
| | | | 5 | 0.44 | 134 μm |
| 7.5 mm | 44.1 | 160 | 10 | 1.32 | 28 μm |
| | | | 5 | 0.66 | 59 μm |
| 10.0 mm | 58.8 | 213 | 10 | 1.77 | 16 μm |
| | | | 5 | 0.88 | 33 μm |
| 20.0 mm | 118 | 426 | 10 | 3.53 | 4 μm |
| | | | 5 | 1.77 | 8 μm |

Figure 9:
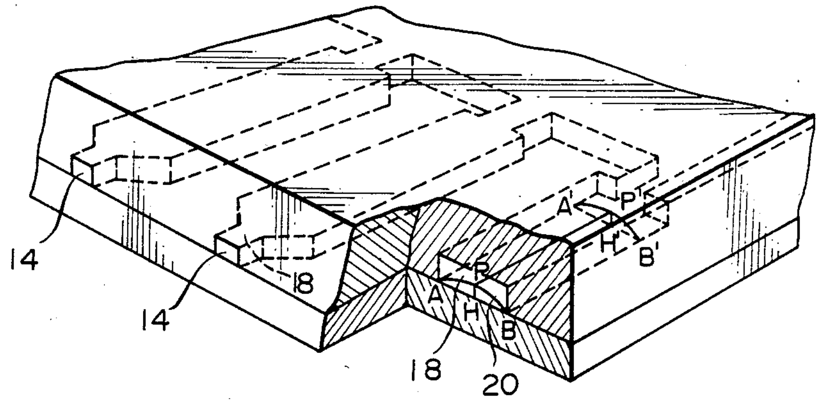
FIG. 9 is a fragmentary view of one embodiment of a multi-nozzle ink jet head in accordance with the present invention which uses a piezoelectric high molecular film as an ink compressing element.

Referring to FIG. 9, one embodiment of a multi-nozzle ink jet head in accordance with the present invention is shown which uses a PVDF film. As shown, the ink jet head is constructed such that multiple nozzles are arranged side by side along the transverse vibrating direction of the PVDF film 20, i.e. the direction of the line AB shown in FIG. 2.

Generally, in a multi-nozzle ink jet head designed for high-resolution printing, it is impossible to provide an ink chamber a large width in a direction perpendicular to a direction of ink flow. For example, concerning an ink jet head having a resolution of 8 dots/mm, the width cannot be larger than about 70 μm in the case of a one-dimensional multi-nozzle array; about 170 μm in the case of a staggered multi-nozzle array; or about 400 μm in the case of a four-layer multi-nozzle array. In the ink chambers which require such delicate shaping, the piezoelectric high molecular films have to be oriented such that they expand and contract in the same direction as, or parallel to, the direction of arrangement of the nozzles, as shown in FIG. 9. Now, assuming that each of multiple nozzles is about 400 μm wide, a case wherein the expanding and contracting direction of the bent piezoelectric high molecular film is parallel to the array of the nozzles and a case wherein the former is perpendicular to the latter will be discussed in a contrastive manner from the standpoint of displacement efficiency which is necessary for the ejection of ink drops.

Figure 10A:
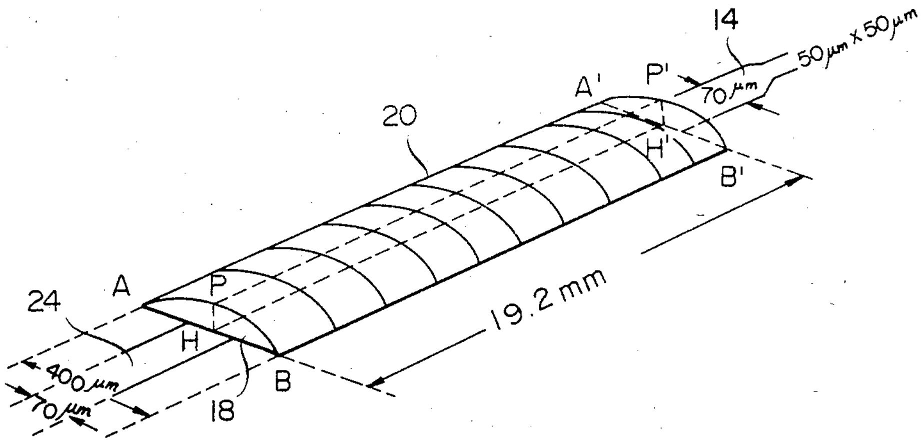
FIGS. 10A and 10B are diagrams showing directions of expansion and contraction of the piezoelectric high molecular film which is bent as shown in FIG. 9.
Figure 10B:
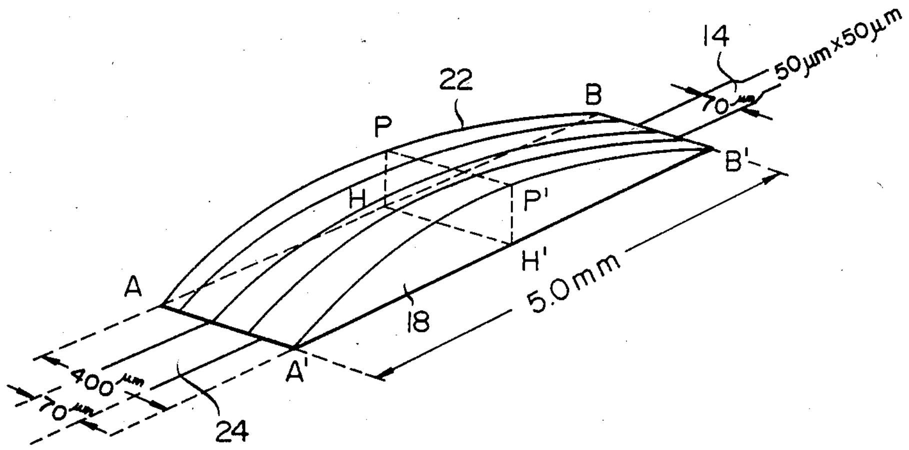
Figure 11A:
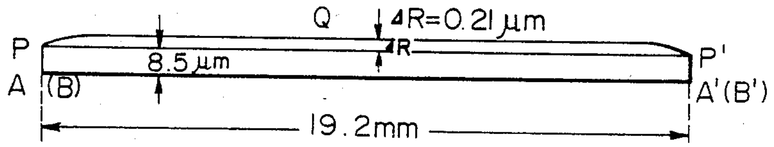
FIGS. 11A and 11B are sections representative of vertical displacements of the piezoelectric high molecular films shown in FIGS. 10A and 10B, respectively.
Figure 11B:
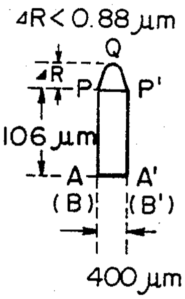

FIG. 10A shows the case where the expansion and contraction of the film 20 occurs in a direction parallel to the array of the nozzles, while FIG. 10B shows the other case where it occurs in a direction perpendicular to the array of the nozzles. Concerning the numerical values in the drawings, the piezoelectric high molecular film 20 or 22 comprises a PVDF film having a thickness of 20 μm and a piezoelectric modulus of $d_{31}$ of 40 PC/N. Design values are selected from Table 2 in such a manner as to satisfy a displacement necessary for ejection of ink drops. The reference numeral 24 designates an ink supply path.

Where the expansion and contraction of the PVDF film occurs in a direction parallel to the array of nozzles, the distance PH is 8.5 μm for a voltage of 30 volts and an efficiency of about 16%. On the other hand, when the former occurs in a direction perpendicular to the latter, the distance PH is 106 μm for a voltage of 10 volts and an efficiency of about 16%. While in the former case the length AA' of the PVDF film perpendicular to the direction of expansion and contraction is open to choice, in the latter case it is exclusively determined by the width of the ink compression chamer 18. when a voltage is applied to the PVDF films 20 and 22 shown in FIGS. 10A and 10B to cause vertical displacements (ΔR) through transverse vibration effect ($d_{31}$), the films 20 and 22 will undergo vertical displacements as shown in FIGS. 11A and 11B, respectively. Specifically, since the configuration shown in FIG. 10A allows the line AA' to be designed sufficiently long, a sufficient length is insured for the vertical displacement (ΔR) as shown in FIG. 11A. In contast, the line AA' and, therefore, the vertical displacement available with the configuration shown in FIG. 10B is very short with the resultant deterioration to the displacement effect. This tendency becomes particularly severe in the case of a staggered multi-nozzle arrangement wherein each ink chamber is about 170 μm wide, and a one-dimensional array, multi-nozzle arrangement wherein an ink chamber is about 70 μm wide.

For the reasons described above, in a high-resolution type ink jet head in which the allowable width of an ink chamber is quite small, it is the prerequisite that the bent piezoelectric film be oriented in such a manner as to expand and contract in a direction parallel to the array of the nozzles.

Figure 12:
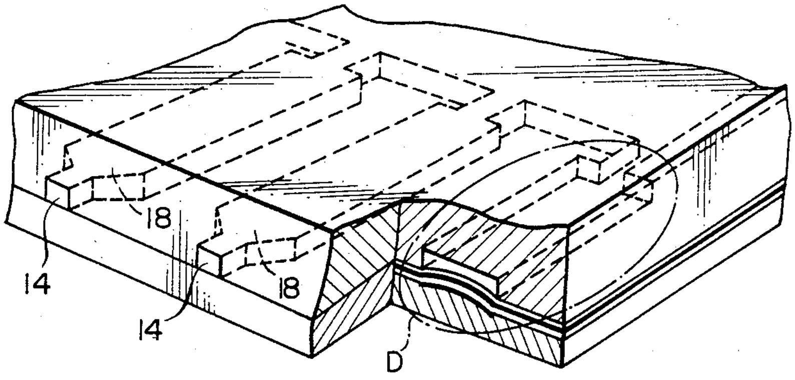
FIG. 12 is a fragmentary perspective view showing a method of producing an ink jet head of the present invention.
Figure 13:
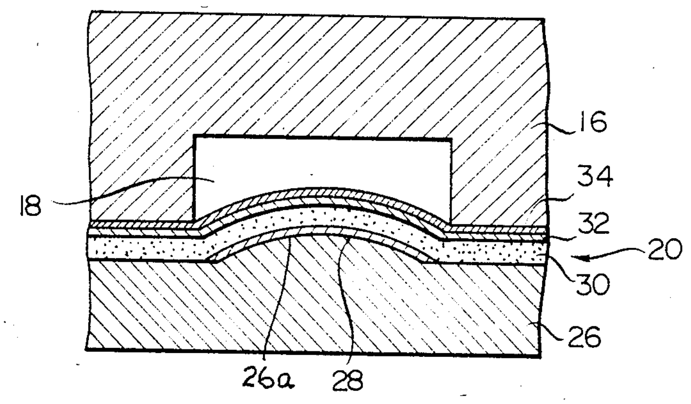
FIG. 13 is a detailed view of a part D shown in FIG. 12.

An exemplary method of producing an ink jet head of the kind described above is shown in FIG. 12. Details of a part of the ink jet head of FIG. 12 which is designated by D are shown in FIG. 13. As shown, the ink jet head comprises a substrate 26 having a curved portion 26a. A conductive layer 28 is deposited on the substrate curved portion 26a, while a thin PVDF film or layer 30 is formed on the conductive layer 28 and the substrate 26 other than the curved portion 26a. Further, a conductive layer 32 and a protective layer 34 are sequentially deposited on the PVDF film 30. Such an ink jet head may be produced by the following steps:

(1) The substrate 26 is formed using glass, resin or like nonconductive material;

(2) Masking of photoresist or the like is applied to the substrate 26 except for those regions where electrodes and leads will be provided;

(3) A conductive material such as aluminum (Al) is deposited on the substrate 26 by evaporation to form electrodes (conductive layers) and leads (not shown);

(4) A piezoelectric PVDF film prepared by uniaxial, low-temperature stretching and polarization is bonded to form the piezoelectric PVDF layer 30;

(5) A conductive material such as Al is deposited as by evaporation to form the conductive layer 32;

(6) The protective layer 34 is deposited by a CVD process or like technique using $SiO_2$, $Si_2N_3$ or any other suitable ink-resistive substance; and (7) The housing 16, prepared by etching a photosensitive glass to form the nozzles 14, ink chambers 18, ink supply section 24, etc., is rigidly connected to the protective layer 34 by mechanical means or such chemical means as bonding such that the ink chambers 18 face the conductive layers 28 in one-to-one correspondence.

Figure 14A:
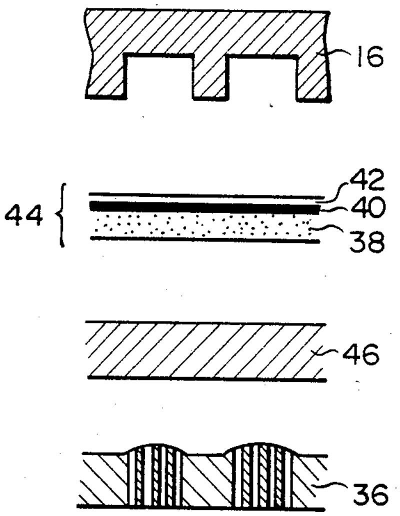
FIGS. 14A and 14B are views also showing a method of producing an ink jet head of the present invention.
Figure 14B:
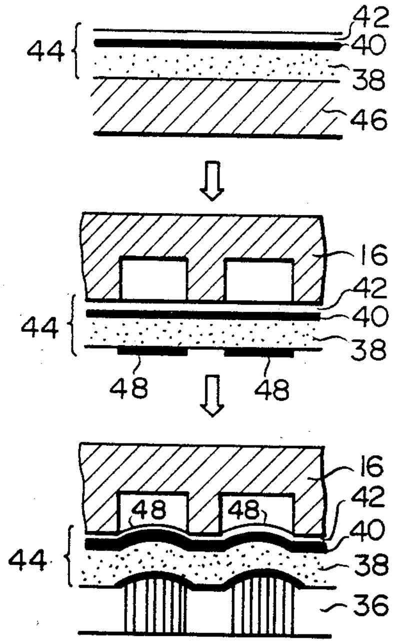

Another possible method of producing the ink jet head concerned is shown in FIGS. 14A and 14B; FIG. 14A is an exploded view and FIG. 14B is a view representative of an assembling steps. The procedure is as follows:

(1) A substrate, or support base, 36 having air passages is formed using a nonconductive material such as glass or resin;

(2) Al or like conductive substance is deposited by evaporation on the one entire surface of a piezoelectric PVDF film 38, which has been subjected to uniaxial, low-temperature stretching and polarization, thereby forming a conductive layer 40;

(3) $SiO_2$, $Si_2N_3$ or any other suitable ink-resistive material is deposited as by the CVD process on a conductive layer 40 to form a layer 42, thereby completing a protective layer 44;

(4) The protective layer 44 is closely laid on a flat support base 46;

(5) The protective layer 44 is bonded to the housing 16 which has been formed by etching a photosensitive glass to shape the nozzles, ink chambers 18, ink supply section 24, etc;

(6) The flat support base 46 is removed from the protective layer 44 whereupon a masking of metal, for example, is applied to that surface of the PVDF film 38 opposite to the conductive layer, or electrode layer, 40 except for those regions which will provide electrodes and leads;

(7) Al or like conductive material is deposited by evaporation to form electrodes (conductive layers 48) and leads (not shown); and (8) The substrate 36 is located such that its curved potions corrspond one-to-one to the respective electrode layers (corresponding to the respective ink chambers 18) and, then, the conductive layers of the film 38 and the curved portions of the substrate 36 are rigidly abutted against each other by mechanical means or chemical means such as bonding.

In this manner, the ink jet head described above is desirable for production on a quantity basis inasmuch as the electrode layer, PVDF layer, electrode layer and protective layer can be treated integrally with each other.

Next, an embodiment of the ink jet head of the present invention will be described with reference to FIGS. 15–21.

Figure 15:
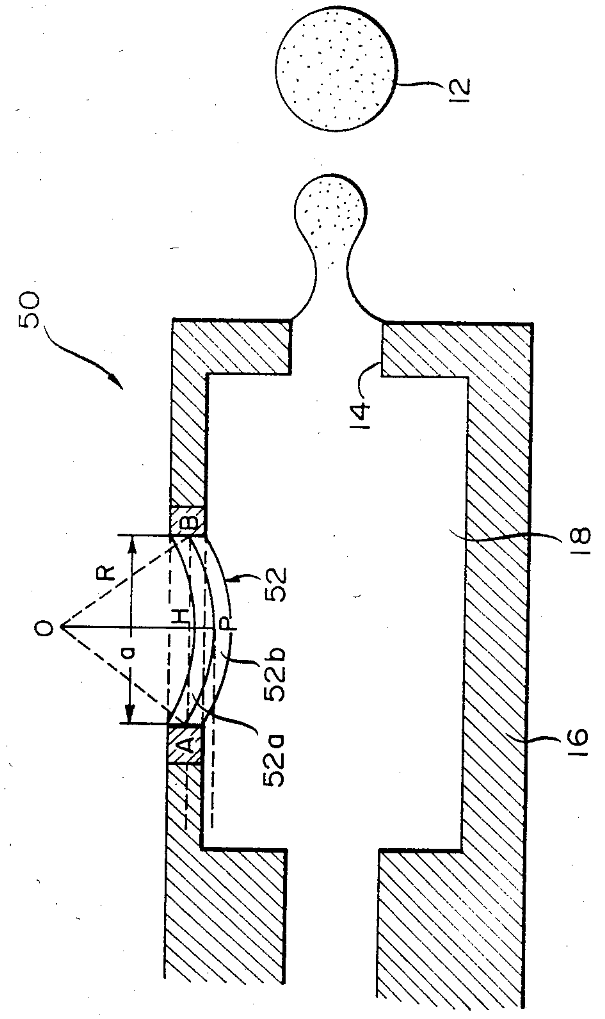
FIG. 15 is a fragmentary section showing one embodiment of an ink jet head which uses a bimorph type piezoelectric high molecular film as an ink compressing element.

In FIG. 15, an ink jet head, generally 50, is constructed to eject an ink drop 12 by compressing ink in an ink chamber 18. As in the above-described embodiment, an ink compressing element of the ink jet head 50 comprises a piezoelectric high molecular substance such as PVDF, the PVDF film having a bimorph structure. Generally, a piezoelectric high molecular film expands and contracts in one direction within a plane when an electric field is applied perpendicularly to the film surface. The amplitude of the expansion and contraction, although originally small, may be magnified to the order of $10^4$ times by employing a bimorph structure. A characteristic feature of this embodiment resides in applying to an ink jet head the considerable amplitude attainable with such a piezoelectric high molecular film having a bimorph structure.

First, reference will be made to FIG. 15 for describing the principle of operation of the ink jet head 50 with the above mentioned bimorph structure.

In FIG. 15, an ink compressing element 52 adapted to compress ink in the ink compression chamber 18 is made of a piezoelectric high molecular substance, which may be PVDF as in the previous embodiment, and made up of two PVDF films 52*a* and 52*b* bonded to each other in a bimorph structure. As already discussed in relation with the first embodiment, the primary requisite for the ink in the chamber 18 to be compressed to form a drop is that the effective displacement of the element 52 when the ink is compressed substantially equals the volume (Vo) of the ink drop 12. Therefore, assuming a nozzle dimensioned 50 μm×50 μm, an effective displacement substantially equal to $$Vo=4/3\pi\times(70/2)^3\ (\mu m^3)$$

is required.

In FIG. 15, let it be assumed that the bimorph 52 made up of the PVDF films 52*a* and 52*b* has a center of curvature O, a radius of curvature of OA=OB (=R), and a chord AP (=a), when caused to bend. Also, imagining a line extending vertically from the center O to the chord AB, the bottom of the line is assumed to be H and the line OH is assumed to intersect the chord AB at P. When applied with a voltage, the bimorph 52 causes one 52*a* of its films to contract and the other 52*b* to expand. Here, the arc APB is a line which does not expand or contract, i.e. it is neutral line. Assume that each of the PVDF films 52*a* and 52*b* is 9 μm thick by way of example. An epoxy layer for bonding the two films together may be less than 1 μm thick. Applying a voltage to the bimorph 52 causes one of the films 52*a* and 52*b* to contract and the other to expand and, therefore, fixing one end of the bimorph 52 allows the other end thereof to displace due to bending. The reciprocal of the radius of curvature R and the applied voltage V are, assuming that the initial curvature when V=0 is infinite (fully horizontal), related as follows:

$$1/R\ (cm^{-1})=5.87\times10^{-3}\ V\ (volt) \qquad \text{Eq. (7)}$$

As described so far, this particular embodiment contemplates to compressing the ink to eject an ink drop 12 by utilizing a change of curvature caused by the application of a voltage to the bimorph 52.

Figure 16:
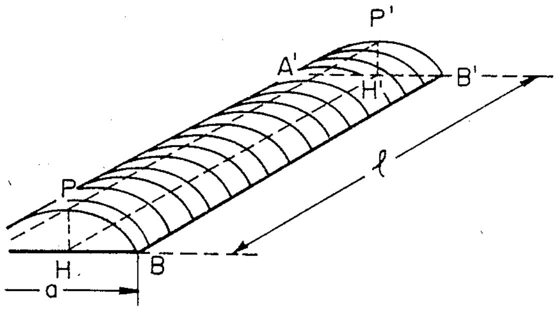
FIGS. 16 and 17 are diagrams demonstrating the principle of operation of the embodiment shown in FIG. 15.

The effective efficiency ΔVeff may be expressed as a product of a displacement area ΔS defined by APBHA, a length l of the PVDF films 52*a* and 52*b* measured in a direction perpendicular to the chord AB when bent as shown in FIG. 16, and an effective efficiency η at the time of ink ejection, i.e. ΔVeff=η·ΔS·l. Therefore, ink will be ejected when the following relation is set up:

$$\Delta Veff=\eta\cdot\Delta S\cdot l=4/3\pi\times(70/2)^3\ (\mu m^3) \qquad \text{Eq. (8)}$$

Figure 17:
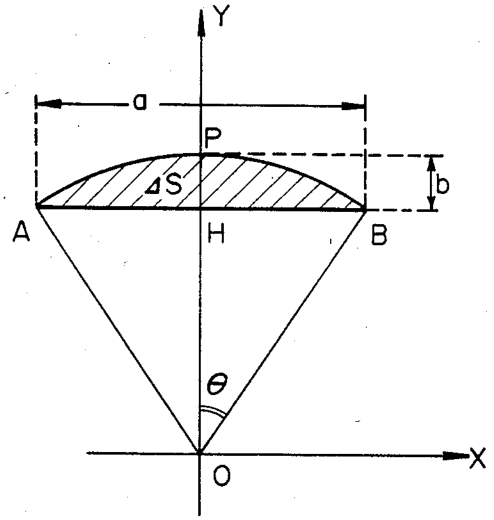
Figure 18:
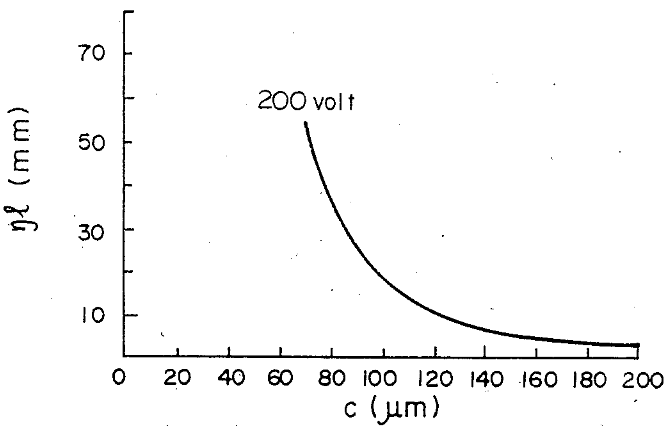
FIGS. 18–21 are plots showing a relationship between a length of a neutral line of the bimorph shown in FIGS. 15–17 and a product of an effective efficiency and a length of a high molecular film with respect to various voltages.
Figure 19:
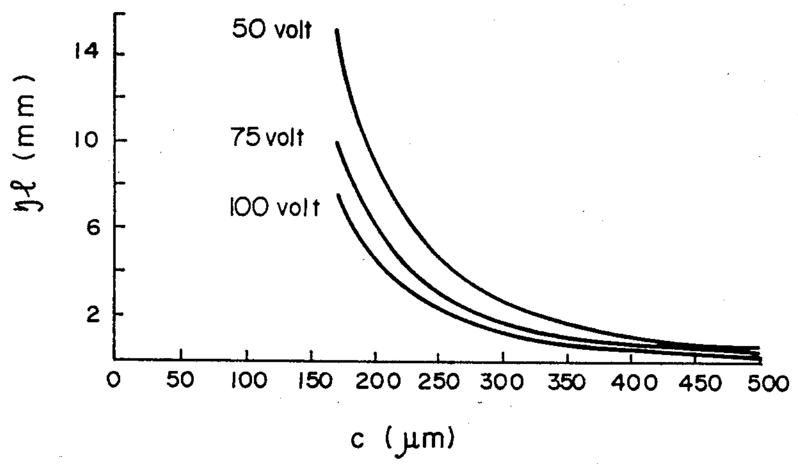
Figure 20:
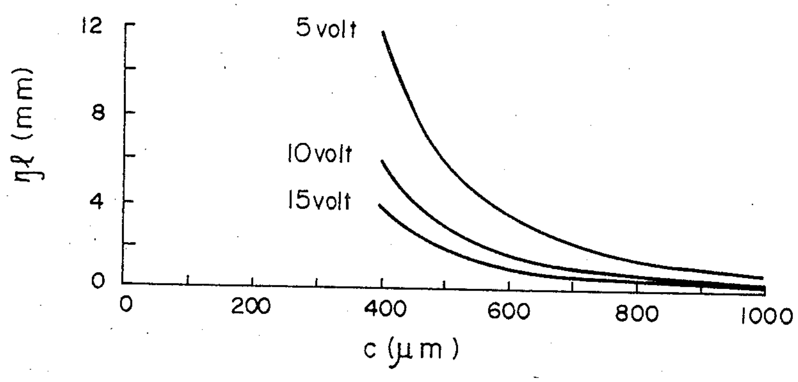
Figure 21:
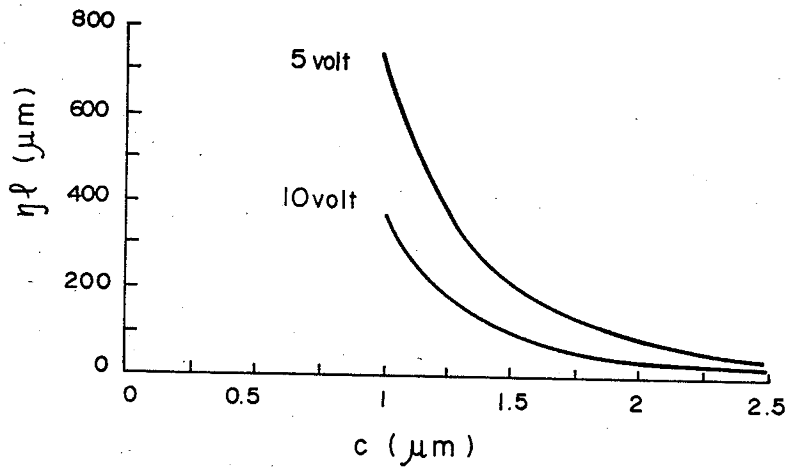

The first necessary operation for the calculation of the effective displacement ΔVeff is calculating the displacement area ΔS and this will be described first. Again, to better understand the procedure, assume coordinates (X, Y) the origin of which is the center of curvature O, as shown in FIG. 17. Let c be the length of the arc APB which is the neutral line of the bimorph 52, a the length of the chord AB, and b the length of the displacement PH of the center portion of the curvature. Then, $$\Delta S = R^2\left\{\frac{\pi}{2} - \frac{a}{2R}\sqrt{1-\left(\frac{a}{2R}\right)^2} - \cos^{-1}\left(\frac{a}{2R}\right)\right\} \qquad \text{Eq.(9)}$$

where $$\left.\begin{aligned} a &= 2R\sin\left(\frac{c}{2R}\right) \\ b &= R\left\{1-\sqrt{1-\left(\frac{a}{2R}\right)^2}\right\} \\ &(0 < b < R) \end{aligned}\right\} \qquad \text{Eq.(10)}$$

Using the Eqs. (7), (9) and (10), the length a of the chord AB and the displacement ΔS can be obtained by applying a drive voltage V to the bimorph 52 which has a predetermined length c of neutral line. Then, substituting that value of of ΔS into the Eq. (8), it is possible to determine an ink ejection condition at the time of ink compression for a specific length c of the neutral line and a drive voltage V, in terms of a relationship between η and l.

EXAMPLE

For example, where c=170 μm and V=100 volts, the efficiency η and the length l are interrelated as shown in Table 3. In this instance, when displaced, the chord AB of the bimorph 52 has a length a of 169.999 μm which is only 0.001 μm shorter than the length of the neutral line, 170 μm. This means that the ends A and B may be fixed. The displacement PH of the center portion of the bimorph 52 is b=0.21 μm.

TABLE 3

| η (%) | l (mm) |
|---|---|
| 100 | 7.47 |
| 50 | 14.9 |
| 30 | 24.9 |

FIGS. 18-21 are plots representative of a relationship between the length c of the neutral line of a bimorph made up of two 9-μm thick PVDF films and the product of the efficiency η and the length l, with respect to various voltages applied to the bimorph. Table 4, on the other hand, shows the radius of curvature R, displacement b of the center portion, length a of the chord, and product of the efficiency η and the length l, which are associated with the length c of the neutral line and applied voltage V. Table 4, too, teaches that the lengths c and a are little different from each other and, therefore, it is allowable to rigidly fix both ends of the bimorph.

TABLE 4

| c | V (volt) | R (mm) | b (μm) | a | ηl |
|---|---|---|---|---|---|
| 70 μm | 200 | 8.52 | 0.07 | 69.9998 μm | 53.5 mm |
| 90 μm | 200 | 8.52 | 0.12 | 89.9996 μm | 25.2 mm |
| 120 μm | 200 | 8.52 | 0.21 | 119.9990 μm | 10.6 mm |
| 140 μm | 200 | 8.52 | 0.29 | 139.9984 μm | 6.7 mm |
| | 100 | 17.0 | 0.14 | 139.9996 μm | 13.3 mm |
| 170 μm | 100 | 17.0 | 0.21 | 169.9993 μm | 7.5 mm |
| | 50 | 34.1 | 0.11 | 169.9998 μm | 14.9 mm |
| 190 μm | 100 | 17.0 | 0.26 | 189.9990 μm | 5.4 mm |
| | 75 | 22.7 | 0.20 | 189.9995 μm | 7.1 mm |
| | 50 | 34.1 | 0.13 | 189.9998 μm | 10.7 mm |
| 200 μm | 75 | 22.7 | 0.22 | 199.9994 μm | 6.1 mm |
| | 50 | 34.1 | 0.15 | 199.9998 μm | 9.1 mm |

TABLE 4-continued

| c | V (volt) | R (mm) | b (μm) | a | ηl |
|---|---|---|---|---|---|
| 400 μm | 50 | 34.1 | 0.59 | 399.9977 μm | 1.15 mm |
| | 20 | 85.1 | 0.23 | 399.99963 μm | 2.87 mm |
| | 10 | 170 | 0.12 | 399.99991 μm | 5.73 mm |
| 500 μm | 50 | 34.1 | 0.92 | 499.9955 μm | 0.59 mm |
| | 10 | 170 | 0.18 | 499.9998 μm | 2.9 mm |
| | 5 | 341 | 0.09 | 499.99995 μm | 5.9 mm |
| 1.0 mm | 10 | 170 | 0.73 | 999.9986 μm | 367 μm |
| | 5 | 341 | 0.36 | 999.9996 μm | 734 μm |
| 2.0 mm | 10 | 170 | 2.93 | 1.99989 mm | 46 μm |
| | 5 | 341 | 1.47 | 1.999997 mm | 92 μm |
| 2.2 mm | 10 | 170 | 3.55 | 2.199985 mm | 34 μm |
| | 5 | 341 | 1.77 | 2.199996 mm | 69 μm |
| 2.5 mm | 10 | 170 | 4.59 | 2.499978 mm | 23 μm |
| | 5 | 341 | 2.29 | 2.499994 mm | 47 μm |

Figure 22:
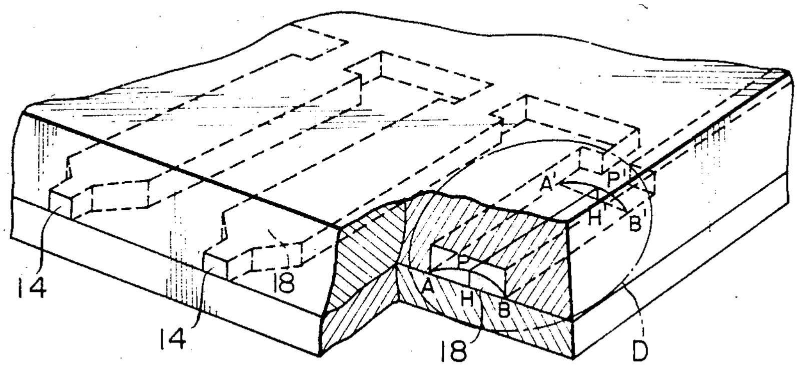
FIG. 22 is a fragmentary view of one embodiment of a multi-nozzle ink jet head in accordance with the present invention which uses a bimorph type piezoelectric high molecular film as an ink compressing element.
Figure 23:
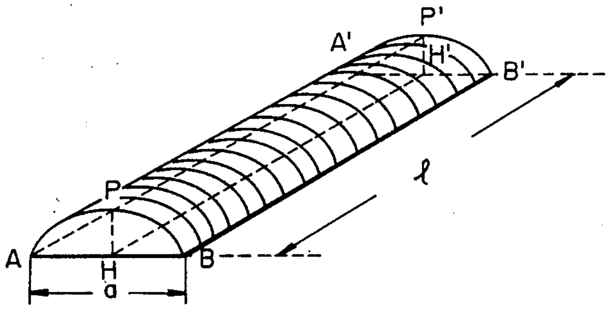
FIG. 23 is a detailed view of a part D shown in FIG. 22.

Referring to FIG. 22, one embodiment of the present invention is shown which also employs a bimorph type piezoelectric high molecular film. Again, the piezoelectric high molecular film 52 shown in FIG. 22 is oriented such that the direction of its transverse vibration, i.e., direction AB shown in FIG. 23, is parallel to the array of multiple nozzles. Why such a particular manner of orientation of a bimorph type piezoelectric high molecular film is desired has already been described and, therefore, will not be discussed any further for simplicity.

Figure 24A:
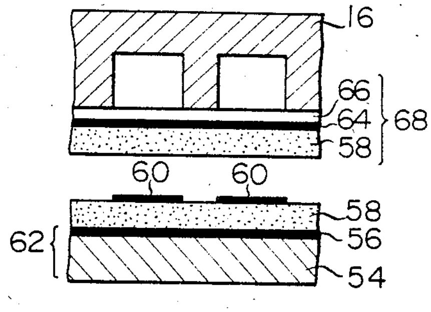
FIGS. 24A and 24B and FIGS. 25A and 25B are views showing different methods of producing ink jet heads in accordance with the present invention.
Figure 24B:
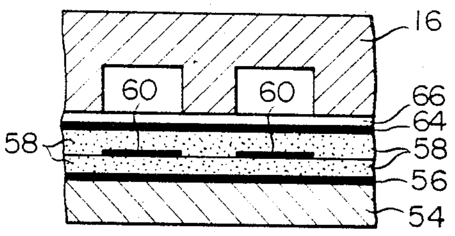

An exemplary procedure for producing the above-described type of bimorph ink jet head is shown in FIGS. 24A and 24B. The ink jet head is shown in an exposed state in FIG. 24A and in an assembled state in FIG. 24B. The procedure is as follows:

(1) A conductive layer 56 is formed using glass, resin or like nonconductive material;

(2) Al or any other suitable conductive material is deposited on the conductive layer 56 by evaporation, for example;

(3) A PVDF piezoelectric film which has previously undergone uniaxial, low-temperature stretching and polarization is bonded to form a PVDF layer 58;

(4) A masking of metal, for example, is applied to the PVDF layer 58 except for those regions which are allocated to electrodes and leads;

(5) Al or like conductive material is deposited by evaporation to form electrodes (electrode layers) 60 and leads (not shown), thereby completing a layer 62;

(6) Al or like conductive material is deposited by evaporation throughout one surface of the PVDF film 58 so as to form a conductive layer 64;

(7) An ink-resistive substance such as $SiO_2$ or $Si_2N_3$ is deposited on the conductive layer 64 by, for example, the CVD process so as to form a layer 66, thereby completing a protective layer 68;

(8) The protective layer 68 is bonded to a housing 16 which is made of glass and etched to have nozzles 14, ink chambers 18, etc; and (9) The resulting subassembly is securely connected to the other subassembly inclusive of the substrate 54 by mechanical means or chemical means such that the ink chambers 18 respectively face the conductive layers 60.

Figure 25A:
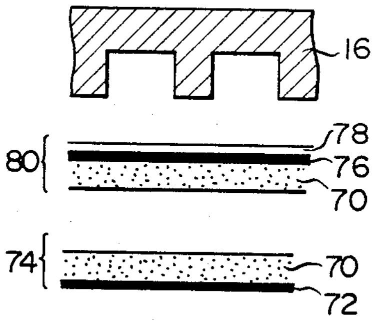
Figure 25B:
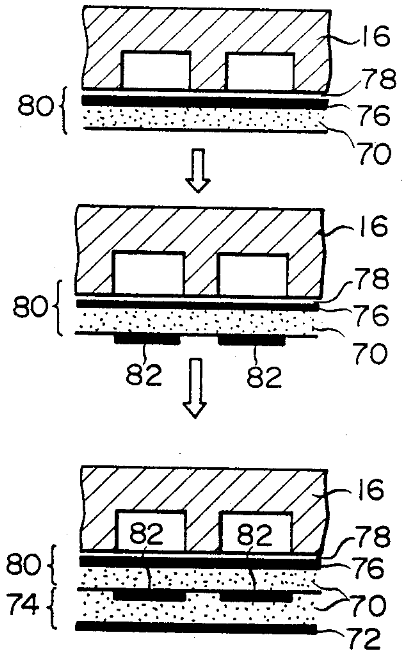

Another procedure for the production is shown in FIGS. 25A and 25B. This alternative procedure is as follows:

(1) Al or any other suitable conductive material is deposited by evaporation on the one entire surface of a PVDF piezoelectric film 70 which has undergone uniaxial, low-temperature stretching and polarization, thereby forming a conductive layer 72 which completes a layer 74;

(2) Al or like conductive material is deposited by evaporation on the one entire surface of the PVDF film 70 so as to form a conductive layer 76. Then, a protective layer 78 of $SiO_2$, $Si_2N_3$ or the like is deposited on the conductive layer 76 by, for example, the CVD process, thereby forming a protective layer 80;

(3) A housing 16 having nozzles, ink chambers, ink supply section and the like is prepared by etching a photosensitive glass. The protective layer 80 is bonded to the housing 16;

(4) A masking is applied to the electrode layer 76 of the protective layer 80 and the PVDF layer opposite to the electrode layer 76 using metal, for example, while leaving electrode regions associated with the ink chambers and lead regions exposed;

(5) By evaporation of Al or like conductive material, electrodes (electrode layers) 82 and leads (not shown) are formed; and (6) The layer 74 is bonded to the protective layer 80 by means of Epikote or like resin, thereby completing a bimorph structure.

Among the various embodiments of the present invention described so far, those which have electrodes deposited by evaporation on substrates would encounter substantial magnitudes of loads when their piezoelectric elements are displaced by a voltage.

Hereinafter will be described some other embodiments which alleviate the load problem. Needless to mention, all of the configurations which will be described are applicable to the foregoing embodiments as well.

Figure 26:
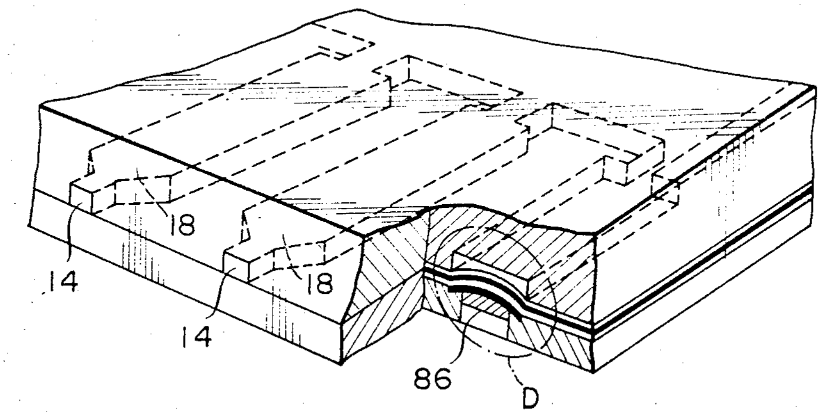
FIGS. 26–31 are views illustrative of various improved versions of the embodiments in accordance with the present invention.
Figure 27:
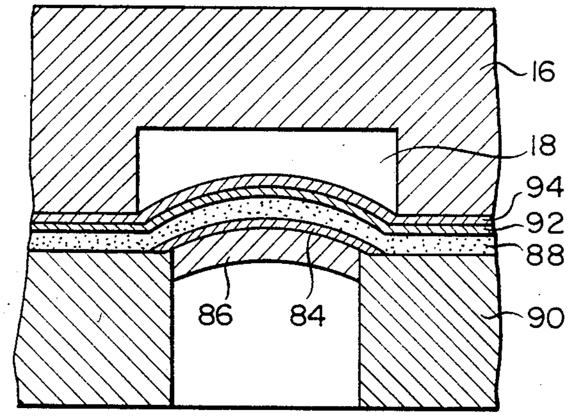

FIG. 26 shows a first alternative configuration, while FIG. 27 shows in detail a part of the configuration which is designated D in FIG. 26. In accordance with the illustrated embodiment, that part of a substrate which corresponds to a conductive layer 84 comprises a thinned portion 86 so that the load resulting from the vertical vibration of a PVDF layer 88 may be reduced. This kind of configuration is advantageous because (1) it increases the displacement efficiency and, therefore, (2) reduces the area of the vibrating portion to enhance high density arrangement, and because where the area is fixed, (3) it allows the drive voltage to be lowered to thereby cut down the dimensions of the drive circuit.

An exemplary method of producing the ink jet head shown in FIGS. 26 and 27 comprises the following steps:

(1) A substrate 90 is formed using glass, resin or like nonconductive material;

(2) A masking is applied to the substrate 90 using photoresist or the like except for those areas where electrodes and leads will be provided;

(3) Al or like conductive material is deposited by evaporation to form electrodes (conductive layers) 84 and leads (not shown);

(4) A PVDF piezoelectric film provided by uniaxial, low-temperature stretching and polarization is bonded to form a piezoelectric PVDF layer 88;

(5) Al or like conductive material is deposited on a conductive layer 92 by evaporation or any other suitable process;

(6) A protective layer 94 is formed using such a material resistive to ink as $SiO_2$ or $SiN_3$ and such a technique as the CVD process;

(7) The base 90 is patterned in correspondence with the respective conductive layers and, then, etched to form the thinner substrate portions 86 (the thickness of the thinner substrate portions 86 is determined by the etching time); and (8) A housing 16, which comprises a photosensitive glass etched to form nozzles, ink compression chambers, ink supply section, etc., is rigidly connected to the protective layer 94 either mechanically or chemically.

Figure 28:
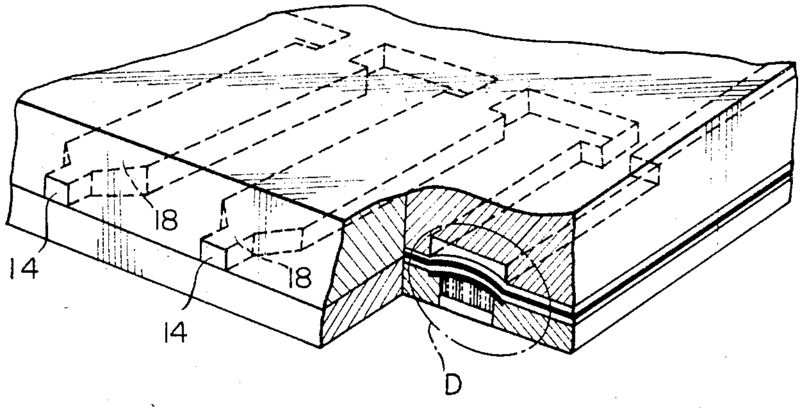
Figure 29:
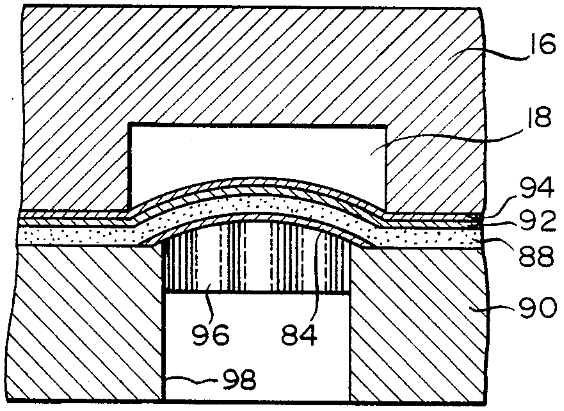

In another alternative embodiment shown in FIGS. 28 and 29, a part of the substrate 90 which corresponds to the conductive layer 84 is locally formed with a bore 98. In another alternative embodiment shown in FIGS. 30 and 31, the entire part of the substrate 90 which corresponds to the conductive layer 84 is formed hollow as at 98. Again, any of such configurations reduces the load when the PVDF layer 88 vibrates up and down to thereby increase the displacement efficiency. This, as previously stated, (1) reduces the area of the oscillation section to enhance high density arrangement, and (2) where the area is fixed, lowers the drive voltage to thereby cut down the dimensions of the drive circuit.

Figure 30:
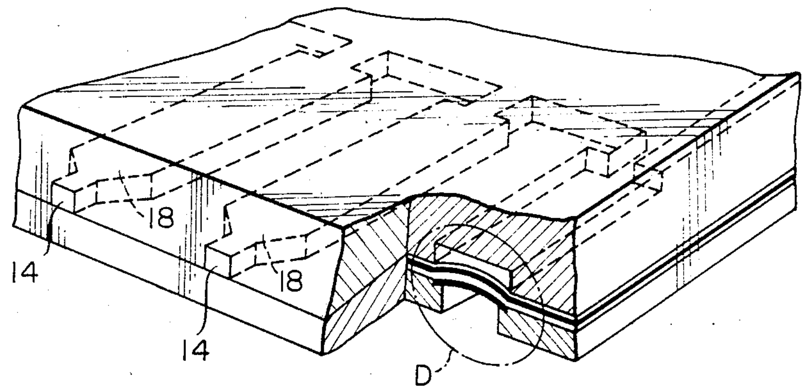
Figure 31:
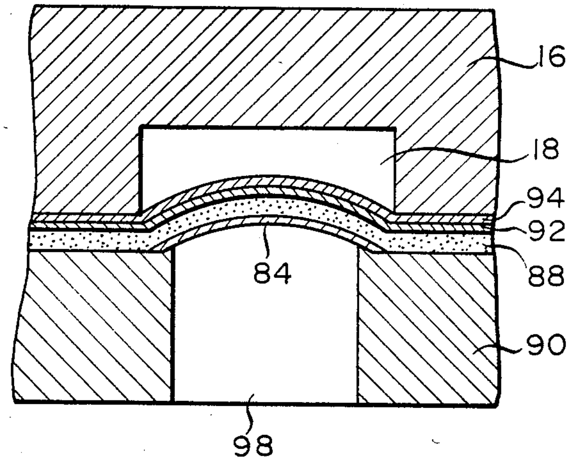

The ink jet head of the kind shown in FIGS. 30 and 31 may be produced by the following exemplary procedure:

(1) The substrate 90 is formed using glass, resin or like nonconductive material;

(2) A masking is applied to the substrate 90 using photoresist, for example, except for those regions where electrodes and leads will be provided;

(3) A conductive material, e.g., Al, is deposited by evaporation to form the electrodes (conductive layers) 84 and leads (not shown);

(4) A PVDF piezoelectric film prepared by uniaxial, low-temperature stretching and polarization is bonded to complete a piezoelectric PVDF layer 88;

(5) Al or like conductive material is deposited by evaporation to form a conductive layer 92;

(6) An ink-resistive material such as $SiO_2$ or $SiN_3$ is deposited by the CVD process or the like to form the protective layer 94;

(7) Patterning associated with the partial or complete bores corresponding to the conductive layers 84 is applied to the substrate 90, followed by etching for forming the partial bores (air passages) 96 or the complete bores 98. At this instant, the materials of the substrate and conductive layers are selected such that different etching liquids are used therefor, whereby etching is terminated when reached the conductive layers so as to leave the partial bores 96 or the complete bores 98; and (8) A housing 16, a photosensitive glass etched to form nozzles, ink chambers, ink supply section, etc., is bonded either mechanically or chemically to the protective layer 94 such that the ink chambers respectively face the electrode layers 84.

As described above, since all the electrode layers, piezoelectric high molecular (PVDF) layer, electrode layer and protective layer can be substituted to integral fine treatment, the ink jet head is desirable for quantity production and feasible for large scale integration which lowers the required drive voltage. In addition, the protective layer needs only be formed on one surface of the PVDF layer, thereby proportionally cutting down the steps of production.

In summary, it will be seen that the present invention provides an ink jet head which is easy to produce in a small size and multi-nozzle configuration, and well adapts itself to treatment to enhance production on a quantity basis.

Various modifications will become possible for those skilled in the art after receiving the teachings of the present disclosure without departing from the scope thereof.

What is claimed is:

1. An ink jet head for compressing ink to eject drops of ink, said ink jet head comprising:

(a) a housing;

(b) an ink chamber defined in said housing;

(c) a nozzle defined in said housing and communicating with said ink chamber;

(d) a non-conductive substrate in opposing relationship to said housing;

(e) a first conductive layer deposited on said non-conductive substrate, said first conductive layer being in opposed relationship to said ink chamber, being curved inwardly toward said ink chamber, and having a radius of curvature R; and (f) a thin film composed of a piezoelectric high molecular substance overlying said first conductive layer and in electrical contact with said first conductive layer, whereby, when a voltage is applied to said first conductive layer during use of the ink jet head, said thin film flexes further into said ink chamber and forces ink in said ink chamber out through said nozzle.

2. An ink jet head as recited in claim 1 wherein said thin film is composed of two films bonded to each other in a bimorph structure, whereby, when a voltage is applied to said first conductive layer during use of the ink jet head, one of said two films is caused to contract and the other of said two films is caused to expand.

3. An ink jet head as recited in claim 1 wherein said film is made of polyvinylidene fluoride.

4. An ink jet as recited in claim 1 wherein:

(a) said ink chamber is rectangular parallelpipepedal in shape, having a long axis and a short axis in the cross-sectional plane parallel to said non-conductive substrate, and (b) said film flexes about an axis parallel to the long axis of said ink chamber.

5. An ink jet head as recited in claim 1 wherein a plurality of ink chambers and nozzles are defined in said housing and a plurality of first conductive layers are deposited on said non-conductive substrate, each of said plurality of first conductive layers being curved, having a radius of curvature R, and being in opposing relationship to a corresponding one of said plurality of ink chambers.

6. An ink jet head as recited in claim 5 and further comprising:

(a) a second conductive layer deposited on said thin film on the side thereof opposite from said plurality of first conductive layers and (b) a protective layer deposited on said second conductive layer, (c) said thin film, said second conductive layer, and said protective layer being sandwiched between said housing and said non-conductive substrate, said protective layer being in planar contact with said housing around said plurality of ink chambers.

7. An ink jet head as recited in claim 6 wherein:

(a) said second substrate layer functions as a common electrode and, (b) during use of the ink jet head, electrical signals are applied to said plurality of first conductive layers independently.

8. An ink jet head as recited in claim 6 and further comprising means for applying electrical signals to each one of said plurality of first conductive layers independently.

9. An ink jet head as recited in claim 5 wherein said non-conductive substrate is thinned in those portions thereof which correspond in position to each one of said plurality of first conductive layers.

10. An ink jet head as recited in claim 5 wherein portions of said non-conductive substrate corresponding to each one of said plurality of first conductive layers are removed.

11. An ink jet head as recited in claim 5 wherein:

(a) said plurality of nozzles are parallel to one another and (b) each of said plurality of films flexes in a direction parallel to the direction of said plurality of nozzles.

* * * * *